(12) United States Patent
Keithley et al.

(10) Patent No.: US 8,823,759 B1
(45) Date of Patent: *Sep. 2, 2014

(54) SYSTEMS AND METHODS FOR LASER SPACING COMPENSATION IN LASER PRINTING DEVICES

(71) Applicant: Marvell International Ltd., Hamilton (BM)

(72) Inventors: Douglas Gene Keithley, Boise, ID (US); Gregory L Unruh, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,071

(22) Filed: May 6, 2013

Related U.S. Application Data

(63) Continuation of application No. 12/887,154, filed on Sep. 21, 2010, now Pat. No. 8,436,883.

(60) Provisional application No. 61/250,136, filed on Oct. 9, 2009.

(51) Int. Cl.
*B41J 2/435* (2006.01)
*B41J 2/47* (2006.01)

(52) U.S. Cl.
USPC .......................... 347/234; 347/229; 347/248

(58) Field of Classification Search
USPC ................. 347/116, 229, 233–235, 248–250
See application file for complete search history.

(56) References Cited

U.S. PATENT DOCUMENTS

| 4,272,771 | A | * | 6/1981 | Furukawa | 347/12 |
| 6,344,870 | B1 | | 2/2002 | Kerby et al. | |
| 7,327,377 | B2 | * | 2/2008 | Matsumoto | 347/238 |
| 7,978,214 | B2 | * | 7/2011 | Plotkin et al. | 347/254 |
| 8,363,080 | B2 | * | 1/2013 | Shin | 347/229 |
| 8,436,883 | B1 | * | 5/2013 | Keithley et al. | 347/234 |
| 2008/0118268 | A1 | | 5/2008 | Scheuer et al. | |
| 2009/0128616 | A1 | | 5/2009 | Plotkin et al. | |

* cited by examiner

*Primary Examiner* — Hai C Pham

(57) ABSTRACT

A method includes providing pixel data that comprises lines of pixel data and shared lines of pixel data, where the shared lines of pixel data are configured such that a first laser and a second laser of a plurality of lasers within a laser printing arrangement will print the shared lines of pixel data during printing of an image on a print medium. The shared lines of pixel data are split between the first laser and the second laser such that two shared lines of pixel data allow for printing of a single line of the image to be printed. During printing, the first and second lasers fire in accordance with lines of the shared lines of pixel data, where the firing of the second laser begins printing of lines of the image and the firing of the first laser completes printing of lines of the image.

18 Claims, 8 Drawing Sheets

SYSTEMS AND METHODS FOR LASER SPACING COMPENSATION IN LASER PRINTING DEVICES

CROSS REFERENCE TO RELATED APPLICATIONS

The present disclosure is a continuation of and claims priority to U.S. patent application Ser. No. 12/887,154, filed Sep. 21, 2010, now U.S. Pat. No. 8,436,883, issued May 7, 2013, which claims priority to U.S. Patent Application No. 61/250,136, filed Oct. 9, 2009, which are incorporated herein by reference.

TECHNICAL FIELD

Embodiments of the present disclosure relate to the field of laser printing devices, and more particularly, to addressing issues related to spacing between lines of printed data during sweeps of lasers during printing.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In a laser printer, printing is achieved by first scanning a digitized image onto an optical photoconductor (OPC). Typically, the scanning is performed with diodes, e.g. laser diodes or light emitting diodes that pulse a beam of energy onto the optical photoconductor. The optical photoconductor typically comprises a movable surface coated with a photoconductive material capable of retaining localized electrical charges. The surface of the optical photoconductor is a continuous area where the surface is logically considered to be divided into small units called pixels. Each pixel is capable of being charged to a given electrical potential, somewhat independent of the electrical charge of each surrounding pixel.

In operation, the pixels are first charged to a base electrical charge as the pixels move past a charging unit during each revolution of the optical photoconductor. Then, as the pixels move past the laser diodes, a beam of energy, e.g. a laser, is pulsed to remove electrical charge from selected pixels. The unaltered and altered pixels thus form an image on the optical photoconductor. One portion of pixels will attract toner, while the other portion will not based on various factors such as the electrical potential of the toner. However, since the lasers have a Gaussian beam intensity shape, the edges of the lasers do extend past the logical rectangular pixel location so adjacent pixels do interact to a certain extent.

The toner is then transferred to a print medium, e.g. paper, transparency, and fabric. After the toner is transferred to the print medium, the toner is affixed thereto. Any residual toner on the equipment is then removed by a cleaning station.

Generally, laser printing devices include multiple laser diodes to create multiple lasers for printing as previously described. Images are printed by moving at least one of the optical photoconductor and/or the laser diodes relative to one another repeatedly, thus resulting in sweeping of the lasers relative to the optical photoconductor. The print medium and the optical photoconductor are also moved relative to one another to print the image onto the print medium. Mirrors are often used between the laser diodes and the optical photoconductor.

FIG. 4 schematically represents a set of printed lines 400 created by three sweeps of lasers associated with eight laser diodes. In the example of FIG. 4, each sweep of the eight laser diodes causes eight corresponding lines to be created as represented by lines 1-8. Undesirable visual artifacts, such as gaps or overlaps, can occur in between sweeps of the lasers. For example, as shown in FIG. 4, a gap 402 exists in between (i) the eighth printed line created during the first sweep of the lasers and (ii) the first printed line created during the second sweep of the lasers. Also, an overlap 404 is present in between (i) the eighth line created during the second sweep of the lasers and (ii) the first printed line created during the third sweep of the lasers.

SUMMARY

In accordance with various embodiments of the present disclosure, a method includes providing pixel data corresponding to an image to be printed on a print medium. The pixel data comprises lines of pixel data and shared lines of pixel data, where the shared lines of pixel data are configured such that a first laser and a second laser of a plurality of lasers within a laser printing arrangement will print the shared lines of pixel data during printing of the image on the print medium. The shared lines of pixel data are split between the first laser and the second laser such that two shared lines of pixel data allow for printing of a single line of the image to be printed. The method further includes printing the image, where printing the image includes repeatedly moving the plurality of lasers and the optical photoconductor (OPC) relative to one another and, while moving the plurality of lasers and the OPC relative to one another, firing the plurality of lasers in accordance with the lines of pixel data and the shared lines of pixel data. Additionally, printing the image further includes moving the print medium and the OPC relative to one another. During moving of the plurality of lasers and the OPC medium relative to one another, the first laser fires in accordance with lines of the shared lines of pixel data and the second laser fires in accordance with lines of the shared lines of pixel data, where the firing of the second laser begins printing of lines of the image and the firing of the first laser completes printing of lines of the image.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION OF EMBODIMENTS OF THE DISCLOSURE

Embodiments of the present disclosure may describe configurations of various components of a laser printing device architecture and associated techniques. In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

The description below includes use of perspective-based descriptions such as bottom. Such descriptions are merely used to facilitate the discussion and are not intended to restrict the application of embodiments of the present disclosure.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)."

The description incorporates use of the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
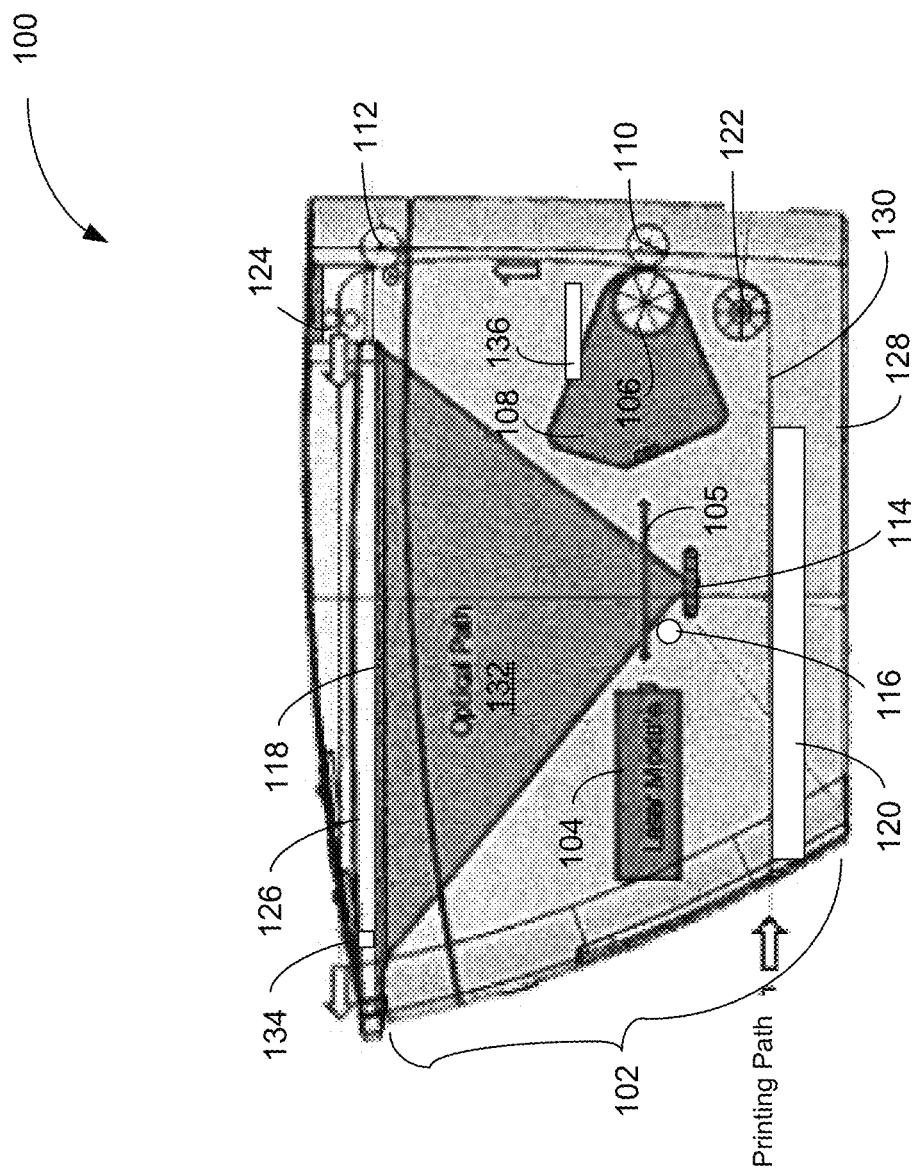
FIG. 1 is a schematic diagram of a laser printing device, in accordance with various embodiments of the present disclosure.

FIG. 1 is a schematic diagram of a laser printing device 100, in accordance with various embodiments of the present disclosure. Laser printing device 100 includes a housing 102, a laser module 104, an optical photoconductor (OPC) 106, a cartridge 108, a transfer mechanism 110, a fuser 112, an area array complementary metal-oxide-semiconductor (CMOS) image sensor 114, an illumination source 116, a transparent surface 118, an input tray 120, a pick mechanism 122, guides 124, and a cover/output tray 126. According to various embodiments, laser printing device 100 may include more or less components than depicted.

Laser printing device 100 includes housing 102 to substantially cover one or more components of the laser printing device 100, such as, for example, components of a printing assembly or copying assembly. Housing 102 substantially protects components within the housing 102 from exposure to undesirable elements such as light, dust, or other debris, and may also protect unsightly or dangerous mechanisms of the laser printing device 100 from a user's view or touch. In an embodiment, housing 102 includes a substantially flat surface 128, to facilitate placement of the laser printing device 100 on a substantially flat surface external to the laser printing device 100.

In the depicted embodiment of FIG. 1, laser printing device 100 includes a laser module 104 for laser printing technology. Laser module 104 includes one or more laser diodes (not shown) or light emitting diodes (LEDs) (not shown) that generate a laser 105 to project an image onto a photoconductor such as OPC 106. As used herein, laser diodes, LEDs, lasers and laser beams may be used interchangeably to generally refer to lasers utilized in laser printing within laser printing device 100. OPC 106 can comprise, for example, an electrically charged rotating drum. OPC 106 is accompanied by a cartridge 108. Cartridge 108 protects OPC 106 and/or provides other functionality associated with laser printing such as, for example, associated optics or mirrors for scanning or beam alignment.

Laser 105 alters a charge on areas of OPC 106 according to a desired image, whereupon particles such as dry ink or toner are electrostatically attracted to the OPC 106 according to the desired image. OPC 106 is pressed or rolled over one or more print mediums at transfer mechanism 110. Fuser 112 applies heat and pressure to bond the dry ink or toner to the one or more print mediums. One or more print mediums may comprise paper in one or more embodiments, but is not limited in this regard and may include other printing media in other embodiments—e.g., transparency film, and so on.

In FIG. 1, an example printing path 130 is indicated by associated directional arrows. Printing path 130 is a path through laser printing device 100 that a print medium follows while undergoing a printing process. Laser printing device 100 includes input tray 120 to receive or hold one or more print mediums for printing by a printing assembly of laser printing device 100. Pick mechanism 122 moves the one or more print mediums through printing path 130 to undergo printing actions including, for example, the actions described with respect to laser module 104, OPC 106, transfer mechanism 110, and/or fuser 112. Guides 124 guide the one or more print mediums to cover/output tray 126. Cover/output tray 126 can be a dual purpose structure configured to cover an adjacent transparent surface 118 used for copying and also configured to serve as an output tray for one or more printed print mediums.

In some embodiments, laser printing device 100 comprises a copying assembly having an area array CMOS image sensor 114 and an illumination source 116 disposed within the housing 102. The copying assembly can be integrated to share a same area as a printing assembly in one or more embodiments. For example, area array CMOS image sensor 114 and illumination source 116 of the copying assembly can share an area of laser printing device 100 with components of a printing assembly such as laser module 104, OPC 106, and/or transfer mechanism 110.

Area array CMOS image sensor 114 is intended to represent a variety of image sensors such as those that are widely employed, for example, in the use of cell phone cameras. Area array CMOS image sensor 114 is also referred to herein as a full array, area array, or CMOS image sensor, or combinations thereof. In an embodiment, CMOS image sensor comprises an active pixel sensor (APS). Hereinafter, area array CMOS image sensor 114 is referred to as "CMOS image sensor" 114. The term "CMOS", as used in the phrase "CMOS image sensor" herein, may refer to a commonly used trade name of an image sensor type to distinguish the image sensor from other types of image sensors such as, for example, linear array contact image sensor (CIS) and/or charge coupled device (CCD) sensors.

Although the term "CMOS" may conventionally refer to a particular manufacturing process to form a device from various materials, the term CMOS as used within this description is not limited to any particular manufacturing process. For example, the phrase "metal-oxide-semiconductor" in the term "CMOS" may conventionally refer to a physical structure of field-effect transistors where a metal gate is formed on an oxide material, which is formed on a semiconductor. Materials other than traditional metals, oxides, and semiconductors may be employed to form analogous devices in emerging semiconductor technologies, however such physical structure may still be referred to as a CMOS device by convention or trade usage. Similarly, "CMOS" as used herein is intended to include image device sensors, for example, that are formed according to emerging semiconductor technologies that utilize such different material structures.

CMOS image sensor 114 is configured to capture one or more images for copying. In an embodiment, CMOS image sensor 114 is configured to capture an entire image of a document at once. For example, CMOS image sensor 114 may not require scanning of one or more documents to capture an image as used in linear array technologies. In an embodiment, CMOS image sensor 114 comprises an optical path 132 that allows image capture of one or more objects placed on a transparent surface 118 of laser printing device 100.

A copying assembly of laser printing device 100 further comprises a substantially flat transparent surface 118 disposed in an optical path 132 of CMOS image sensor 114 to support an object for image capture by the CMOS image sensor 114. An object for image capture may comprise a variety of articles including, for example, one or more documents, photographs, or three-dimensional objects. Substantially flat transparent surface 118 can comprise glass, plastic, or any other suitable material to provide a substantially flat, transparent surface for imaging/copying.

In an embodiment, the substantially flat transparent surface 118 of the copying assembly is substantially parallel with the substantially flat surface 128 of the housing 102. CMOS image sensor 114 is disposed between the substantially flat transparent surface 118 of the copying assembly and the substantially flat surface 128 of the housing 102, within an area of the housing 102 where the printing assembly is disposed.

Laser printing device 100 further comprises a cover 126 coupled to the laser printing device 100 such that cover 126 can move to an "open" position and a "closed" position. In the open position, cover 126 substantially exposes transparent surface 118; and in the closed position, cover 126 substantially covers the transparent surface 118. Cover 126 can further be configured to function as an output tray for one or more printed documents in the closed position. For example, guides 124 can output a printed document onto a surface of cover 126. A printed document can be removed by a user, for example, before cover 126 is opened.

Laser printing device 100 further includes an interlock 134 operatively coupled with cover 126 and configured to disable laser module 104 when cover 126 is in an open position. Interlock 134 can comprise a mechanical or electrical interlock, or combinations thereof, according to one or more embodiments. Interlock 134 can comprise a same mechanism to disable laser module 104 that may be used when laser printing device 100 is opened for maintenance or troubleshooting purposes including, for example, changing a cartridge 108 or clearing a paper jam. In one or more embodiments, transparent surface 118 further comprises a filter coating to block laser light of laser module 104 from exiting through transparent surface 118 of the copying assembly. Combinations of such features may be implemented according to various embodiments. Such features may increase safety of using laser printing module 104 by preventing or reducing laser exposure through transparent surface 118.

A variety of features may be implemented in laser printing device 100 to protect OPC 106 from excessive light exposure. In an embodiment, OPC 106 is configured to rotate when cover 126 is in the open position and/or when illumination source 116 is enabled to reduce localized overexposure of OPC 106 to ambient or illuminative light. Laser printing device 100 further comprises a shade structure 136 operatively coupled with cover 126 to prevent or reduce exposure of OPC 106 to ambient light when cover 126 is in the open position. For example, an interlock 134 can indicate that cover 126 is open, which may cause a signal to be sent to move shade structure 136 into a position that protects OPC 106 from light that may enter through transparent surface 118. Shade structure 126 comprises a shutter mechanism in an embodiment.

Laser printing device 100 further comprises an illumination source 116 disposed within housing 102. Illumination source 116 can comprise any of a variety of light sources to provide sufficient light to allow image capture by CMOS image sensor 114. In an embodiment, illumination source 116 includes one or more light-emitting diodes (LEDs) and/or cold cathode fluorescent lamps (CCFLs) and can include one or more color or white lights.

Figure 2:
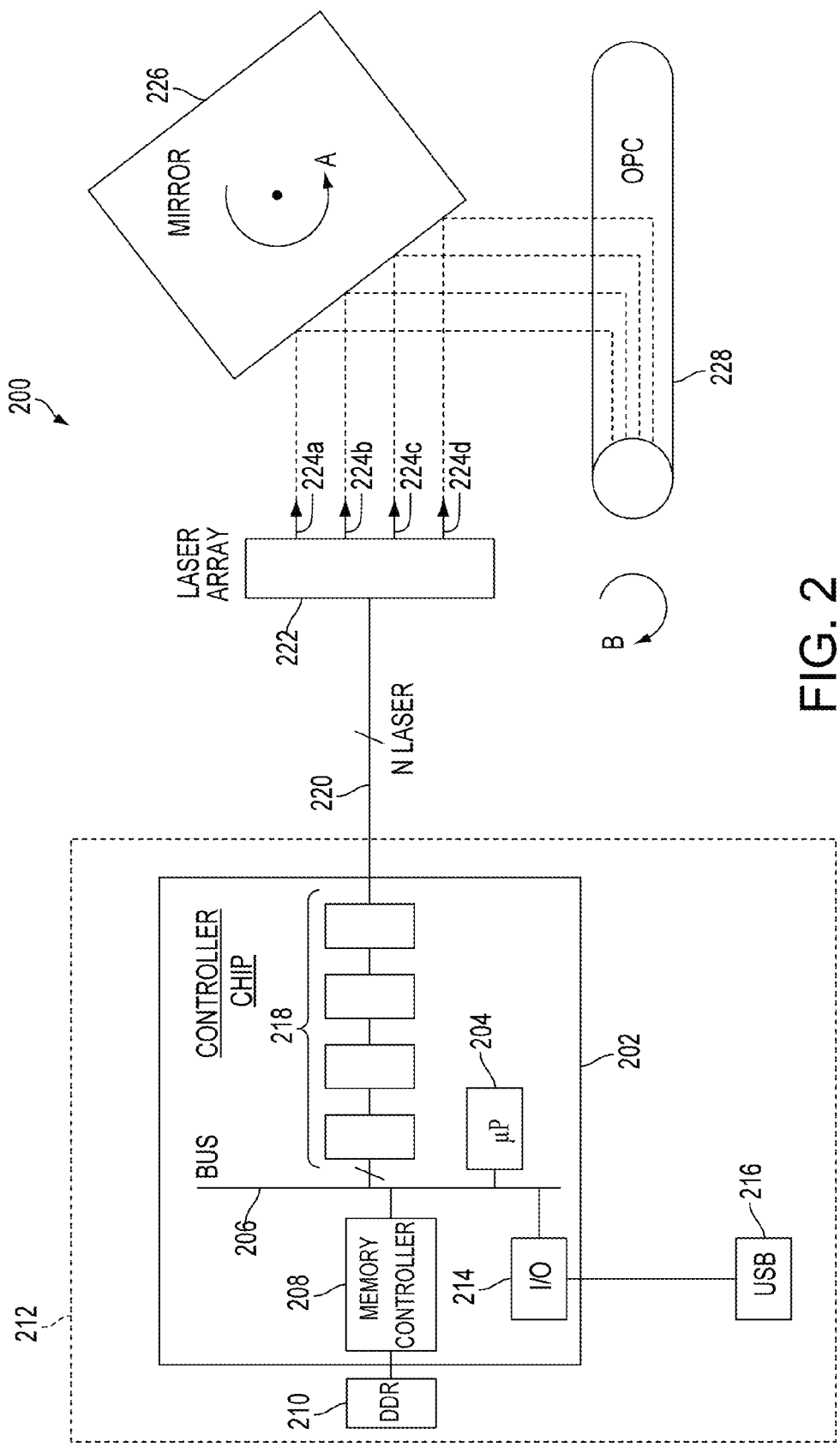
FIG. 2 is a schematic diagram of a printing arrangement of the laser printing device of FIG. 1, in accordance with various embodiments of the present disclosure.

FIG. 2 schematically illustrates a printing arrangement 200 for use with a laser printing device 100 of FIG. 1. Printing arrangement 200 may include laser module 104 and OPC 106, as well as other components. Printing arrangement 200 includes a controller chip 202 that includes a microprocessor 204. Microprocessor 204 is coupled to a bus 206 that is coupled to a memory controller 208, all of which are also included on controller chip 202. Memory controller 208 is coupled to an external memory 210 that may be in the form of double data rate (DDR) memory. External memory 210 is included on a circuit board 212 that also includes controller chip 202. External memory 210 may, in various embodiments, be included on a separate circuit board from controller chip 202. Controller chip 202 also includes an input/output (I/O) interface 214, which is also coupled to bus 206. I/O interface 214 is coupled to a USB port 216 that is included on circuit board 212. USB port 216 may be used to couple printing arrangement 200, thereby laser printing device 100, to a computing device (not shown), and/or some type of network. Other types of ports besides USB port 216 are also possible in various embodiments.

Controller chip 202 also includes at least one video channel 218 that is coupled via laser coupling line 220 to a laser array 222. Laser array 222 includes laser diodes 224A-224D. In the exemplary embodiment illustrated in FIG. 2, laser array 222 includes four laser diodes 224A-224D. More or fewer laser diodes may be included and the present disclosure is not limited in this regard. Depending upon the number of laser diodes included with laser array 222, a corresponding number of video channels 218 are included on controller chip 202. Thus, in the exemplary embodiment illustrated in FIG. 2, controller chip 202 includes four video channels 218, where each video channel 218 corresponds to a particular laser diode 224A-224D. For clarity and simplicity, only one video channel 218 is illustrated in FIG. 2.

Printing arrangement 200 further includes a mirror 226 and an organic photoconductor (OPC) 228. During operation of printing arrangement 200, mirror 226 continually rotates in a direction indicated by A and OPC 228 continually rotates in a direction indicated by B in FIG. 2. Laser diodes 224A-224D fire at mirror 226, which then reflects the resulting lasers, as indicated by the phantom lines, onto OPC 228. The continually rotating mirror 226 deflects the lasers across the surface of OPC 228. The mirror continues to rotate in the direction A thereby moving the reflected lasers axially along OPC 228, as indicated by the phantom lines. Once the lines of pixel data for laser diodes 224A-224D are completed, the lasers will reach an edge of one facet or side of mirror 226. When the lasers start to reflect off of the next facet of mirror 226, the reflected lasers will travel along the phantom lines onto OPC 228 and move axially along OPC 228 (due to the continued rotation of the mirror 226), but at new positions on OPC 228 due to the rotation of OPC 228. The distance the constantly rotating OPC 228 has rotated between switching between facets of mirror 226 will set the amount of overlap or gap between the sets of lines created by the lasers and the rotating mirror 226. The print medium (not shown) moves past and relative to the OPC 228 to print the image onto the print medium.

Figure 3:
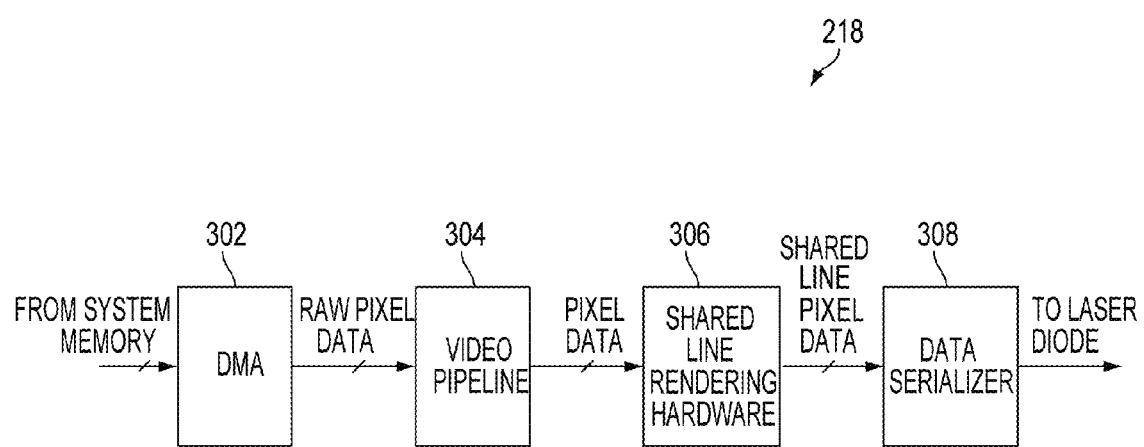
FIG. 3 is a schematic diagram of a video channel of the printing portion of FIG. 2, in accordance with various embodiments of the present disclosure.

Referring to FIG. 3, each video channel 218 includes a direct memory access (DMA) module 302 that provides raw pixel data to a video pipeline module 304 that is included within each video channel 218. Video pipeline module 304 converts the raw pixel data to lines of pixel data, which is then provided to a shared line rendering hardware block module 306 that is included within each video channel 218. Shared line rendering hardware block module 306 will create shared lines of pixel data for two or more of laser diodes 224A-224D, as will be described in further detail herein. The shared lines of pixel data and the lines of pixel data are then forwarded to a data serializer module 308 included within each video pipeline 218, which serializes the lines of pixel data and the shared lines of pixel data, and provides the lines of pixel data and the shared lines of pixel data to laser array 222 and the particular laser diode of laser diodes 224A-224D that corresponds to the particular video channel 218.

In accordance with various embodiments, the video pipelines 218 are included within an application-specific integrated circuit (ASIC) of controller chip 202. Other components within controller chip 202 may or may not be included within the same ASIC as video channels 218, depending upon the application.

In order to print an image, memory controller 208 retrieves an image to be printed from memory 210. Alternatively, an image may be retrieved via USB port 216 and I/O interface 214 and provided to microprocessor 204. In either case, the image to be printed is provided to the video channels 218. The image to be printed is provided in the form of raw pixel data. The video channels 218 then convert the raw pixel data into lines of pixel data corresponding to a particular laser diode 224 to be fired and thereby create lasers at mirror 226, which reflects the lasers towards the OPC 228. Alternatively, the data may be retrieved as lines of pixel data and shared lines of pixel data, in which case the operation of the video channels 218 may be simplified and even eliminated.

Figure 4:
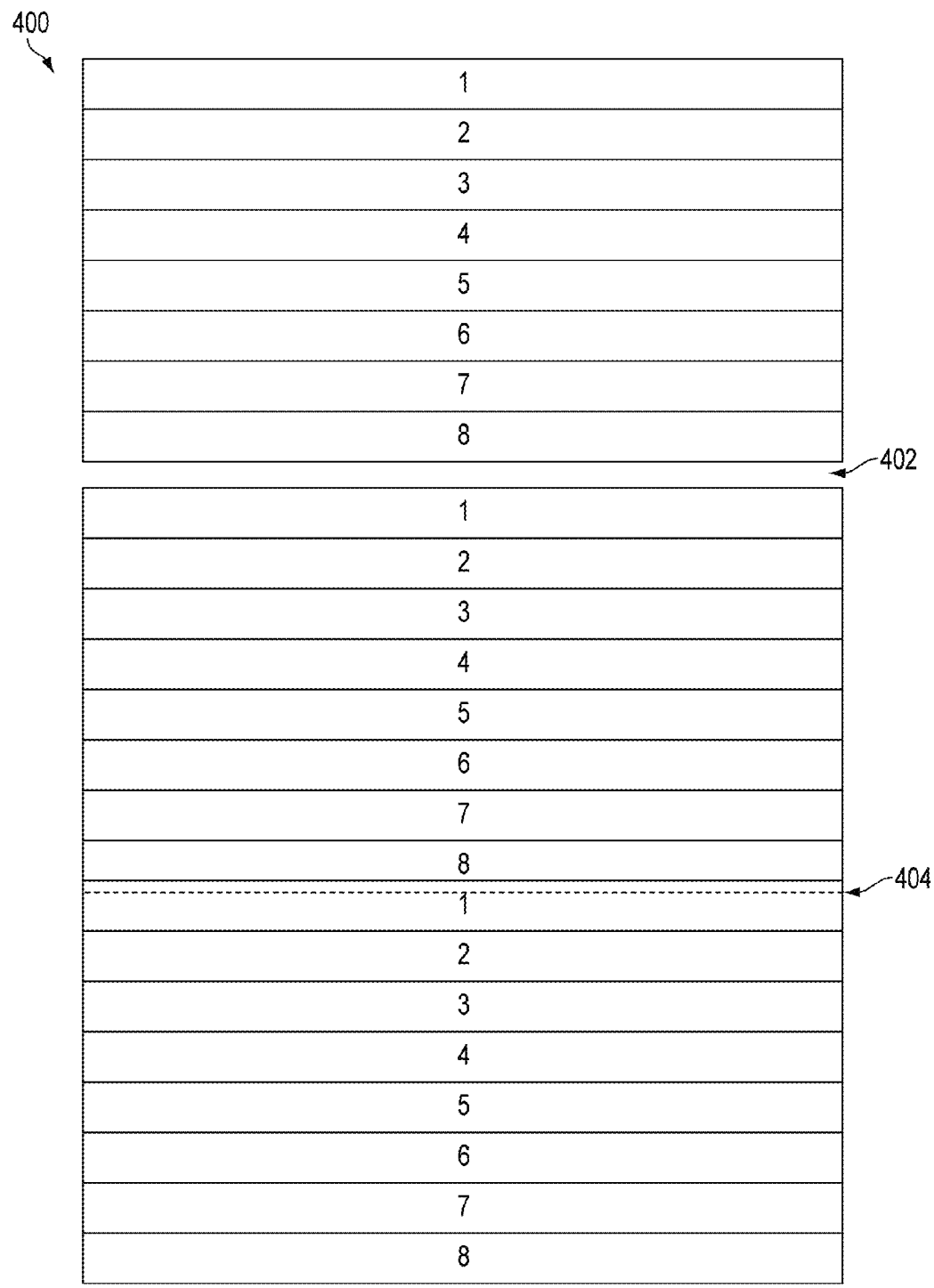
FIG. 4 is a schematic view of a set of printed lines from a laser printer, in accordance with a prior art method.

As previously described, FIG. 4 schematically represents a set of printed lines 400 created by sweeps of lasers from laser diodes 224. In the example of FIG. 4, eight laser diodes 224 are included within laser printing device 100. In the example to be described herein for describing embodiments of the present disclosure with respect to FIGS. 4-9, laser printing device 100 includes eight laser diodes 224 and thus, eight video channels 218. More or less laser diodes 224 and video channels 218 may be included in laser printing device 100 and the present disclosure isn't limited in this regard.

As previously described, the printed lines of set 400 are represented by lines 1-8. As may be seen at 402, a gap is present from the eighth printed line created by the eighth laser diode during a first sweep of the lasers and the first printed line from a first laser diode in a second sweep of the lasers. At 404, an overlap is present between line eight created by the eighth laser diode and the first printed line of the first laser diode between the second sweep of the lasers and a third sweep of the lasers. Because of such gaps or overlaps, printed images can have various visual artifacts and defects visible to the naked eye where these gaps and overlaps occur.

In accordance with the various embodiments of the present disclosure, in order to significantly reduce artifacts attributable to gaps and overlaps between sweeps of the lasers from the laser diodes 228, two or more lasers from the laser diodes 224 intentionally overlap their respective printing of pixel data between sweeps of the lasers. For example, in the present example, the laser array 222 includes eight laser diodes 224 that produce eight lasers, yet only seven lines from the lasers advance with each sweep of the lasers over the OPC 228, as opposed to the prior art method of advancing all eight lines. Thus, the first and last printed line of each sweep of the lasers are overlapped by two lasers; in this example, the bottom laser of one sweep and the top laser of another sweep.

In accordance with the present disclosure, the lines of data for the top laser and the bottom laser are digitally alternated such that the top laser and bottom laser do not try and render the same portion of a printed line, but are coordinated such that they each only render portions of the printed line. However, when the portions of the line are combined, the combined portions recreate all of the data for the printed line. Such sharing and overlapping of the top and bottom lasers reduce the artifacts and visual defects created at the printed lines of the printed image created by the overlapping lasers.

In accordance with the various embodiments, a method for creating the overlap between the lasers is to alternate pixels, i.e., even pixels for one laser and odd pixels for the other laser for each line of pixel data that is to be used for the overlapping of lasers. This requires taking lines of pixel data that are to be used for the overlapping of lasers and creating shared lines of pixel data. Thus, during one sweep or pass of the lasers, the bottom laser diode will fire during the even pixels to begin printing an overlapped line in an image to be printed and during the next sweep of the lasers, the top laser diode will fire to complete printing of the overlapped line in the image to be printed.

Figure 5:
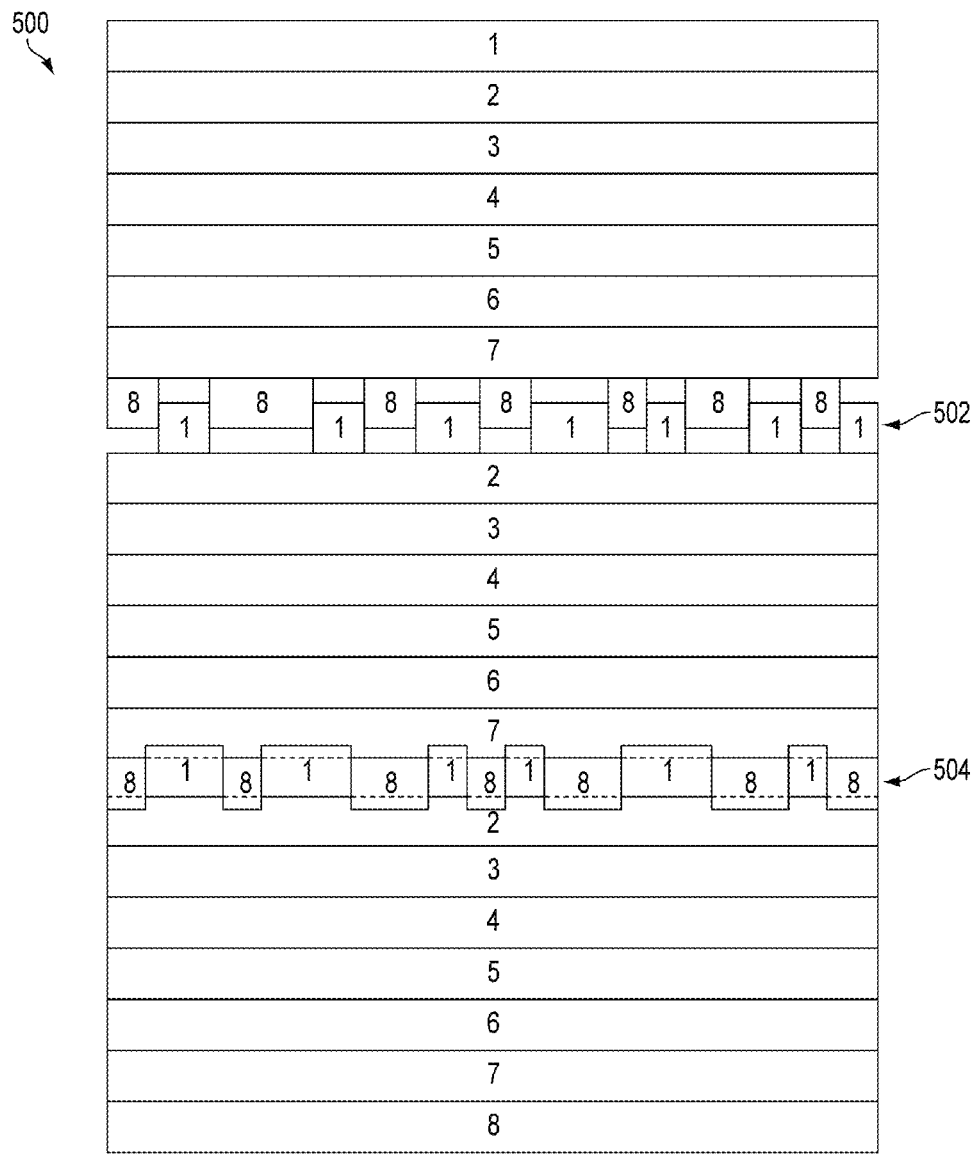
FIG. 5 is a schematic view of a set of printed lines from a laser printer, in accordance with various embodiments of the present disclosure.

FIG. 5 schematically illustrates how forcing an overlap and alternating the data between the overlapped lasers looks with the same gap error 402 and overlap error 404. As can be seen, the gap and overlap are no longer positioned at a same location across the entire image. By breaking up this gap or overlap, the visual artifacts and defects of a printed image may be less noticeable to the naked eye. The area 502 now represents the gap area previously illustrated in FIG. 4 at 402, while the area 504 represents the overlap area 404 of FIG. 4. As can be seen, the individual blocks 8 at 502 represent a first sweep of the lasers where the eighth laser is fired to produce pixels, while the blocks 1 at 502 represent where the first laser is fired to produce pixels in the second sweep of the lasers. This completes printing of a first shared line of data at 502 within the printed image. The individual blocks 8 at 504 represent the second sweep of the lasers where the eighth laser is fired to produce pixels, while the blocks 1 at 504 represent where the first laser is fired to produce pixels in a third sweep of the lasers. This completes printing of a second shared line of data at 502 within the printed image.

Figure 6:
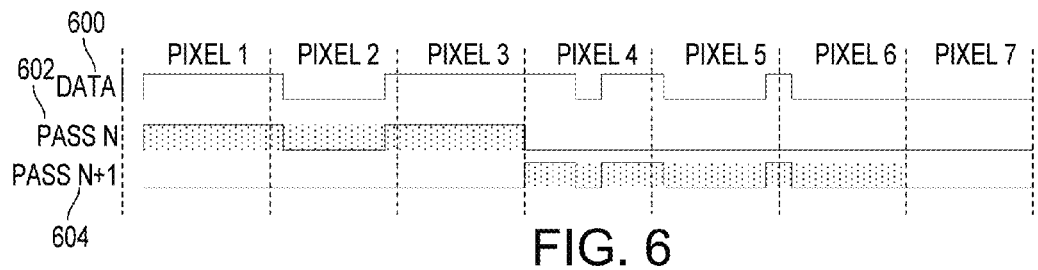
FIGS. 6-9 are graphs of desired output for a single, non-overlapped laser versus time and the same data alternately being output to two separate overlapping lasers, in accordance with various embodiments of the present disclosure.
Figure 7:
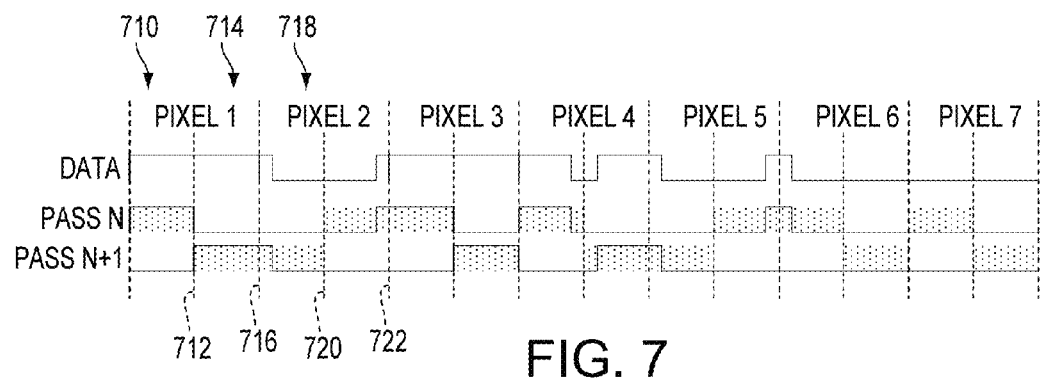
Figure 8:
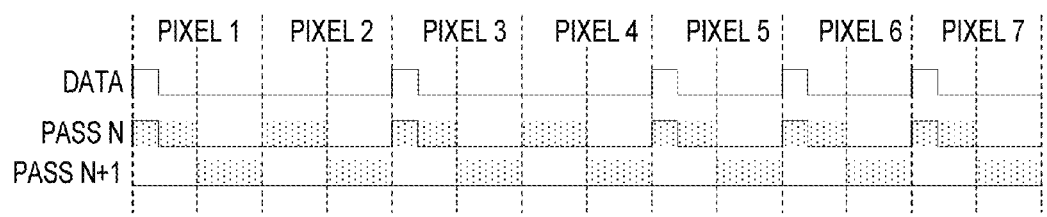
Figure 9:
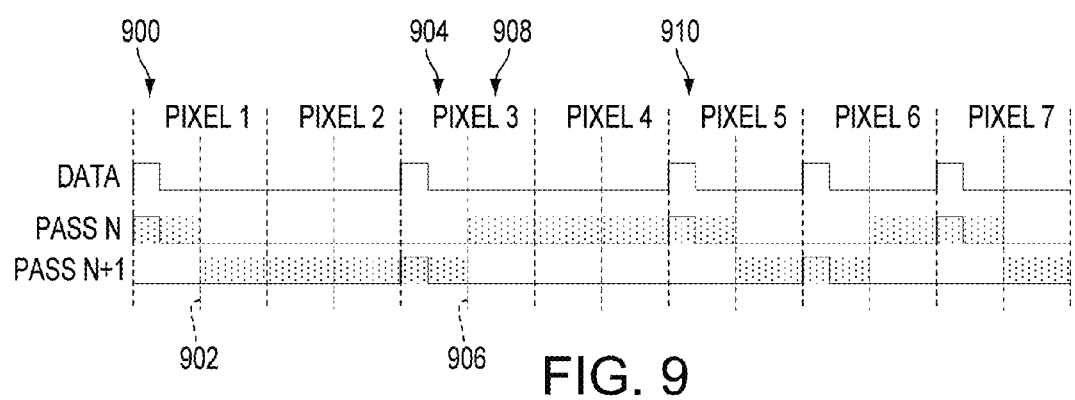

FIG. 6 illustrates a graph of desired output for a single (non-overlapped) laser versus time and the same data alternately being output to two separate overlapping lasers (Pass N and Pass N+1). Thus, line 600 represents an unaltered line of pixel data. Lines 602 and 604, together, represent a shared line of pixel data. While the graph in FIG. 6 illustrates lines 602 and 604 coincidentally, thus implying that lines 602 and 604 are alternatingly produced on the same pass (sweep), the lasers actually do not produce the data during the same sweep of the lasers, so lines 602 and 604 are outputting on different sweeps (or passes) of the lasers. However, lines 602 and 604 are illustrated in FIG. 6 coincidentally so that one can see how lines 602 and 604 reconstruct the original line of pixel data represented by line 600. In FIG. 6, a high output indicates that the laser is turned on (firing) and a low value indicates that the laser is turned off (not firing). The horizontal areas of the graph for each pixel represent the time for executing pixel data related to each pixel.

As is known in the art, there are four pixel descriptions with respect to firing of laser diodes for various pixels versus time. More particularly, the types include centered, left justified, right justified and split. Thus, data for each pixel may involve executing some the data partially outside of the time for the pixel illustrated in the graph. In FIG. 6, pixels 2, 4, and 5 are "split" with equal or nearly equal pulses located on the left and right side of the pixel time. Pixel 6 is left justified having only a single pulse on the left side of the pixel time. Pixels 2, 5 and 6 represent narrow pulses that if these pixel times had no pulses on either side of them, they might be too narrow to reproduce. Many laser systems have a minimum laser on-time for the laser diodes. Thus, for such systems, the minimum laser on-time could be violated if the data is arbitrarily divided between the two laser diodes. For instance, a pixel that generates a full-on pulse of a laser diode, followed by a left justified pixel can result in a single output pulse of the laser diode. The left justified pixel can be a very short pulse (when viewed as a single pixel), but to the laser diode, it is simply the previous pulse extended by a small amount. If these two adjacent (and connected) pulses were separated between two laser diodes, the full-on pulse would be fine for the first laser diode, but the narrow left justified pulse may violate a minimum laser on-time for the second laser diode and thus, may not be able to be produced on its own by the second laser diode.

Thus, in accordance with various embodiments, the method for creating the overlap between the lasers can include starting with a first pulse for a first laser and if a subsequent pulse can be performed by a second laser without any timing violations, then the subsequent pulse can be performed by the second laser. Data would be identical for each of the overlapping lasers, so as long as the overlapping lasers have different starting conditions, such a method works out well. Thus, for two lasers, the first laser is assigned the first pixel and the second laser waits for a condition that allows the second laser to be assigned a pixel and to thereby begin operation in a subsequent sweep of the lasers.

Referring again to FIG. 6, the shaded areas of lines 602 and 604 illustrate which laser pass gets to reproduce the incoming data based on the currently described embodiment for assigning pixels to the lasers in the shared line of pixel data. If a first laser is outputting the data on Pass N with pixel 1, it will also output pixels 2 and 3 since pixel 2 requires a pulse next to it on both adjacent pixels. If this pattern of pixel 1 (laser diode full-on) and pixel 2 (split narrow pixel) continues, there might never be a condition that would allow a transition to an alternate laser.

To address the possibility of never transitioning to an alternate laser, in accordance with various embodiments, each pixel is split into two equal pixels or half pixels. As may be seen in FIG. 7, each half pixel includes only a single pulse for a laser. With such a method, the data from a line of pixel data can now be split between the two passes and both lasers will be alternating back and forth frequently. As previously mentioned with the embodiment of the method prior to splitting the pixels, the method includes allowing the laser to take over as soon as possible. For simplicity, the method can ignore whether there is actually data to output. Thus, with reference to FIG. 7, the two lasers alternate even when outputting no pulse. Accordingly, for Pass N, a laser fires at 710 and the pulse is complete at the half pixel of pixel 1 indicated by 712. The shared line of pixel data switches to the second laser and during Pass N+1, the second laser fires at 714. Because the pulse is not complete at the end of the second half of pixel 1 at 716, the second laser continues to fire into the first half pixel of pixel 2 at 718. During the first half of pixel 2, the pulse ends and thus, during the second half of pixel 2 at 720, and during Pass N, the first laser fires, with this pulse continuing through the first half of pixel 3 and ending at the first half of pixel 3 at 722. As can be seen, this pattern continues such that a shared line of data is created during Pass N and Pass N+1 by the two lasers. As can be seen at pixels 6 and 7, the switch occurs at each half pixel, even if there is no data to be output.

Since the shared line of pixel data will alternate between the lasers at the half pixel points as long as a laser is not firing at that point, some patterns within a shared line of pixel data may result in only a single laser ever firing. An example of such a pattern can be seen in FIG. 8. In the example, the data and the line of pixel data only requires a pulse from a laser at the beginning of each pixel, i.e., at the first half pixel for each pixel. Thus, as can be seen, during Pass N, the first laser will fire at the beginning of pixels 1, 3, 5, 6 and 7. Since the first pixel is not firing at the half pixel mark in each of pixels 1-7, the shared line of data results in switching to the second laser for Pass N+1 at the second half of each pixel 1-7. However, there is no data to be output with the shared line of pixel data during the second half of each pixel 1-7 and thus, during Pass N+1, the second laser never fires.

Accordingly, in accordance with various embodiments, the method can be altered such that a further requirement for switching to a laser requires that a laser have fired prior to switching to the other laser. Thus, as may be seen in FIG. 9, the line of pixel data is rendered into a shared line of pixel data such that during Pass N, during the first half of pixel 1 at 900, the first laser fires. Since the pulse of the first laser is complete by the end of the first half of pixel 1 at 902, the shared line of pixel data switches to the second laser for execution during Pass N+1. However, during the second half of pixel 1 and pixel 2, the second laser does not fire. Thus, when the next pulse is required during the first half of pixel 3 at 904, the second laser fires during Pass N+1. At the end of the first half of pixel 3 at 906, the pulse executed by the second laser during Pass N+1 is complete and thus, the shared line of pixel data switches at 908 so that the first laser takes over during the Pass N until it finally executes a pulse during the first half of pixel 5 at 910. In summary, the first half of pixel 1 generates a pulse by a laser, and thus, the next half pixel can be handed to a subsequent laser. The second half of pixel 1 does not generate a pulse, so the laser continues to look for something to do and does not hand off to the first laser since it has not yet generated a pulse. The first pulse generated by the second laser is at the first half of pixel 3 and thus, when this pulse is complete, the second half of pixel 3 can be handed back to the first laser.

Figure 10:
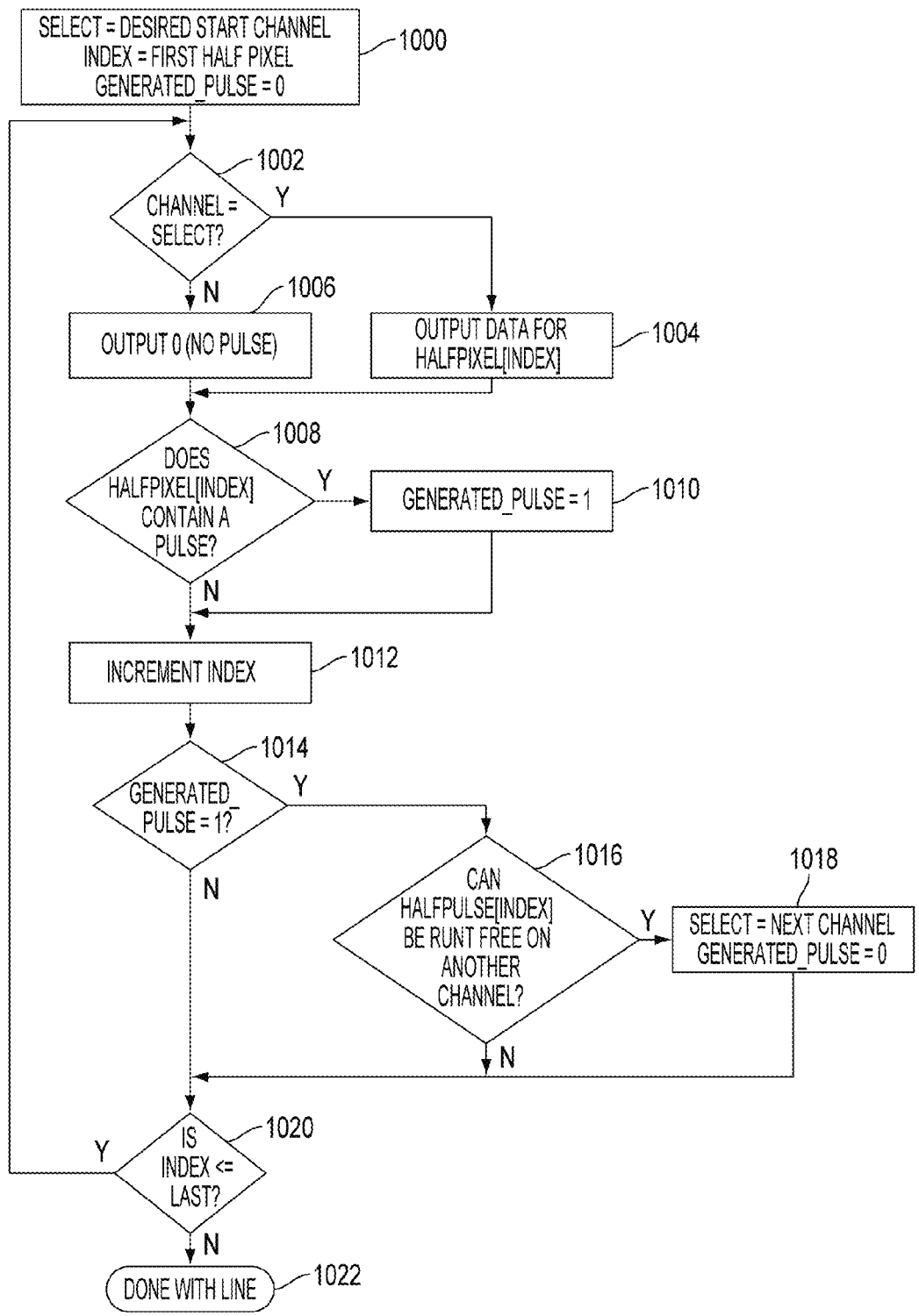
FIG. 10 is a flow chart illustrating an algorithm for implementing methods in accordance with various embodiments of the present disclosure.

FIG. 10 represents a flow chart for implementing an algorithm that can be implemented in the video channels 218 for the lasers 224 that will execute shared lines of pixel data. In the present example, two channels (two lasers) will be used to print shared lines of pixel data when printing an image. More lasers and channels may be used if desired. At 1000, the algorithm begins by selecting a desired start channel and the index for the beginning of the shared line of pixel data is the first half pixel of pixel 1, with the generated_pulse variable set to zero. At 1002, the algorithm checks to see if the channel is equal to the selected channel. If it is, then at 1004, the laser diode outputs data for the half pixel. If at 1002 the channel does not equal the selected channel, then the output is set to 0 so there is no output data on the corresponding laser at 1006. At block 1008, the algorithm checks the output data to see if the half pixel contains a pulse. If the half pixel contains a pulse does, then at 1010 the generated_pulse variable is set to 1 to indicate a pulse was output to a laser and then the index is incremented at 1012. If the half pixel does not contain a pulse, then the index is incremented at 1012. At 1014, the algorithm checks to see if a pulse has been generated. If it has, then at block 1016, the algorithm checks to make sure that the next half pulse can be executed by another channel (laser) without violating any minimum standards for the laser (i.e., that the next pulse can be "runt" free). If the next half pulse can be executed properly by the next laser, then at block 1018, the next channel (laser) is selected and the generated pulse becomes zero. If at 1016, the next half pulse cannot be generated runt free, then the channel remains the same. At block 1020, the algorithm checks the index to see if the end of the shared line of data has been reached. If the end of the shared line of data has been reached, then the shared line of data has been completed. If the shared line of data is not at the end, then the algorithm returns to block 1002.

Since the same shared lines of pixel data will be presented to more than one laser channel at different times (i.e., during different sweeps of the lasers), each laser channel includes an algorithm similar to that described in FIG. 10. In the example of FIGS. 4-10, there are only two channels that create the shared lines of data, channel 0 and channel 1. Either channel could include 0 as the start channel. Thus, at 1000 and 1018, the select equal next channel just toggles between 0 and 1. For a two laser overlap, the next channel would just toggle between the two overlapped channels. Many sequences are acceptable and thus, the present disclosure is not limited in this regard.

For hardware implementation, all video channels 218, as previously described, are generally constructed as identical video channels such that each video channel 218 responds to the channel selection as being channel zero. Thus, the separation of data among the video channels 218 requires programming different starting values for each video channel 218. For example, the first video channel 218 can be started with zero and the other channels can start with different channel numbers so that all video channels 218 do not output the same data.

In accordance with various embodiments, it should be noted that the first and last lines of an image to be printed will be exceptions for the shared rendering or use of shared lines of pixel data. For example, in the eight laser system example described in conjunction with FIGS. 4-10, channel zero (the first laser) and channel seven (the last laser) would be the video channels that utilize shared lines of pixel data. However, for an image to be printed, the first line of the image will not have the last laser overlapping in a subsequent pass. Accordingly, the first line of the image to be printed needs to be printed in its entirety by the first laser. Likewise, the last line of the image to be printed will not have the first laser overlapping with the last laser and therefore, the last laser needs to render all of the last line of the image to be printed. While this exception is not detailed in the algorithm flowchart of FIG. 10, the exception may be added to the first decision diamond 1002 such that the condition could be changed to (channel=select) or (first_line AND all_first_line) OR (last_line AND all_last_line). With the addition of two more programmable selects: all_first_line and all_last_line, the output data block 1004 is set up to output all the data for the first or last line. Alternatively, the first line of the image to be printed may begin with a line printed by the second laser during a first pass of the lasers, while the last line of the image to be printed may be printed with the seventh laser during a final pass of the lasers.

Referring back to FIG. 3, as previously noted, DMA module 302 retrieves image data for an image to be printed from the system memory 210 (or via the I/O interface 214). DMA module 302 passes the individual pixel data to video pipeline module 304, which processes the individual pixel data into lines of pixel data. In addition to the pixel data, DMA module 302 also sends information to the downstream hardware to indicate the start of an image to be printed, the end of a line, and the end of an image to be printed. Shared line rendering hardware block 306 utilizes this information to indicate the first and last line of an image to be printed and when a line for a laser has finished printing.

Video pipeline module 304, in some embodiments, may apply some form of modification to the pixel data, such as changing the pixel size or the pixel type (left, right, center, split). The configuration information used by video pipeline module 304 must be identical for shared line rendering hardware modules 306 in each video channel 218 so that the same modifications are performed on the pixel data.

Shared line rendering hardware module 306 then processes the lines of pixel data by either passing the lines of pixel data straight through to data serializer module 308 (for lasers 224 that are not utilizing shared lines of pixel data), and creating shared lines of pixel data for lasers 224 that are utilizing shared lines of pixel data. The shared lines of pixel data are passed along, along with the unaltered lines of pixel data, from shared line rendering hardware module 306 to data serializer module 308. Data serializer module 308 serializes the multi-bit pixel data lines and then passes the serialized lines of pixel data to laser diode 224 that corresponds to the video channel 218. Lasers 224 then fire accordingly.

Thus, one or more of DMA modules 302, video pipeline modules 304, shared line rendering hardware modules 306 and data serializer modules 308 may form a processing module. Additionally, one or more of DMA modules 302, video pipeline modules 304, shared line rendering hardware modules 306, data serializer modules 308 and microprocessor 204 may serve as or form a controller to facilitate control of a laser printing device 100.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
providing pixel data corresponding to an image to be printed on a print medium, wherein the pixel data comprises a plurality of lines of pixel data, wherein the plurality of lines of pixel data comprises (i) a first line of pixel data, (ii) a first shared line of pixel data, and (iii) a second line of pixel data, wherein the first line of pixel data, the first shared line of pixel data, and the second line of pixel data are three consecutive lines of pixel data of the plurality of lines of pixel data, wherein the first shared line of pixel data comprises a plurality of sections, wherein the plurality of sections comprise a first group of sections and a second group of sections, and wherein each section of the first group of sections is interleaved between two corresponding sections of the second group of sections; and
printing the image on the print medium, wherein printing the image on the print medium comprises
based on laser pulses generated by a first laser generation component of a plurality of laser generation components, printing the first group of sections of the first shared line of pixel data on the print medium,
based on laser pulses generated by a second laser generation component of the plurality of laser generation components, printing the second group of sections of the first shared line of pixel data on the print medium, wherein the second laser generation component is different from the first laser generation component,
based on laser pulses generated only by a third laser generation component of the plurality of laser generation components, printing the first line of pixel data on the print medium, and
based on laser pulses generated only by a fourth laser generation component of the plurality of laser generation components, printing the second line of pixel data on the print medium.

2. The method of claim 1, wherein printing the first group of sections of the first shared line of pixel data further comprises:
printing the first group of sections of the first shared line of pixel data such that for each section of the first group of sections of the first shared line of pixel data, at most a corresponding single laser pulse is generated by the first laser generation component.

3. The method of claim 2, wherein printing the second group of sections of the first shared line of pixel data further comprises:
printing the second group of sections of the first shared line of pixel data such that for each section of the second group of sections of the first shared line of pixel data, at most a corresponding single laser pulse is generated by the second laser generation component.

4. The method of claim 1, wherein each section of the plurality of sections of the first shared line of pixel data comprises at least one half of a pixel of the image to be printed on the print medium.

5. The method of claim 1, further comprising:
refraining from using laser pulses generated by the first laser generation component to print any section of the second group of sections of the first shared line of pixel data; and
refraining from using laser pulses generated by the second laser generation component to print any section of the first group of sections of the first shared line of pixel data.

6. The method of claim 1, wherein the image is printed based on laser pulses generated by the plurality of laser generation components, wherein during each sweep of the laser pulses generated by the plurality of laser generation components, a subset of the plurality of lines of pixel data is being printed, and wherein printing the image on the print medium further comprises:
printing the first group of sections of the first shared line of pixel data on the print medium, using laser pulses generated by the first laser generation component, during a first sweep of laser pulses generated by the plurality of laser generation components; and
printing the second group of sections of the first shared line of pixel data on the print medium, using laser pulses generated by the second laser generation component, during a second sweep of laser pulses generated by the plurality of laser generation components.

7. The method of claim 6, wherein the second sweep of laser pulses generated by the plurality of laser generation components is subsequent to the first sweep of laser pulses generated by the plurality of laser generation components.

8. The method of claim 1, wherein the first laser generation component is one of a laser diode or a light emitting diode.

9. The method of claim 1, wherein:
the image is printed based on laser pulses generated by N laser generation components, wherein N is a non-zero positive integer, wherein the N laser generation components comprises at least the first laser generation component and the second laser generation component;
the plurality of lines of pixel data comprises (i) a plurality of shared lines of pixel data and (ii) a plurality of non-shared lines of pixel data, wherein the plurality of shared lines of pixel data comprises the first shared line of pixel data; and
each shared line of pixel data of the plurality of shared lines of pixel is separated from a nearest shared line of pixel data by a fixed number of non-shared lines of pixel data, wherein the fixed number is based on N.

10. An apparatus comprising:
a processing module configured to provide pixel data corresponding to an image to be printed on a print medium, wherein the pixel data comprises a plurality of lines of pixel data, wherein the plurality of lines of pixel data comprises (i) a first line of pixel data, (ii) a first shared line of pixel data, and (iii) a second line of pixel data, wherein the first line of pixel data, the first shared line of pixel data, and the second line of pixel data are three consecutive lines of pixel data of the plurality of lines of pixel data, wherein the first shared line of pixel data comprises a plurality of sections, wherein the plurality of sections comprise a first group of sections and a second group of sections, and wherein each section of the first group of sections is interleaved between two corresponding sections of the second group of sections;
a plurality of laser generation components comprising (i) a first laser generation component, (ii) a second laser generation component that is different from the first laser generation component, (iii) a third laser generation component, and (iv) a fourth laser generation component; and a print module configured to
- based on laser pulses generated by the first laser generation component, print the first group of sections of the first shared line of pixel data on the print medium,
- based on laser pulses generated by the second laser generation component, print the second group of sections of the first shared line of pixel data on the print medium,
- based on laser pulses generated only by the third laser generation component, print the first line of pixel data on the print medium, and
- based on laser pulses generated only by the fourth laser generation component, print the second line of pixel data on the print medium.

11. The apparatus of claim 10, wherein the first laser generation component is configured to generate at most a corresponding single laser pulse for printing each section of the first group of sections of the first shared line of pixel data.

12. The apparatus of claim 11, wherein the second laser generation component is configured to generate at most a corresponding single laser pulse for printing each section of the second group of sections of the first shared line of pixel data.

13. The apparatus of claim 10, wherein each section of the plurality of sections of the first shared line of pixel data comprises at least one half of a pixel of the image to be printed on the print medium.

14. The apparatus of claim 10, wherein:
- laser pulses generated by the first laser generation component is not used to print any section of the second group of sections of the first shared line of pixel data; and
- laser pulses generated by the second laser generation component is not used to print any section of the first group of sections of the first shared line of pixel data.

15. The apparatus of claim 10, wherein:
- during each sweep of laser pulses generated by the plurality of laser generation components, a subset of the plurality of lines of pixel data is being printed,
- the print module is further configured to
  - print the first group of sections of the first shared line of pixel data on the print medium, using laser pulses generated by the first laser generation component, during a first sweep of laser pulses generated by the plurality of laser generation components, and
  - print the second group of sections of the first shared line of pixel data on the print medium, using laser pulses generated by the second laser generation component, during a second sweep of laser pulses generated by the plurality of laser generation components.

16. The apparatus of claim 15, wherein the second sweep of laser pulses generated by the plurality of laser generation components is subsequent to the first sweep of laser pulses generated by the plurality of laser generation components.

17. The apparatus of claim 10, wherein each of the first laser generation component and the second laser generation component is one of a laser diode or a light emitting diode.

18. The apparatus of claim 10, wherein:
- the image is printed based on laser pulses generated by N laser generation components, wherein N is a non-zero positive integer, wherein the N laser generation components comprises at least the first laser generation component and the second laser generation component;
- the plurality of lines of pixel data comprises (i) a plurality of shared lines of pixel data and (ii) a plurality of non-shared lines of pixel data, wherein the plurality of shared lines of pixel data comprises the first shared line of pixel data; and
- each shared line of pixel data of the plurality of shared lines of pixel is separated from a nearest shared line of pixel data by a fixed number of non-shared lines of pixel data, wherein the fixed number is based on N.

* * * * *